(12) United States Patent
Nakakubo et al.

(10) Patent No.: US 8,578,824 B2
(45) Date of Patent: Nov. 12, 2013

(54) WHEEL LATHE

(75) Inventors: Hirofumi Nakakubo, Nagaoka (JP);
Takio Nakamura, Nagaoka (JP);
Katsunori Kabasawa, Nagaoka (JP);
Tetsuya Yanagisawa, Nagaoka (JP)

(73) Assignee: O-M Ltd., Osaka (JP)

( * ) Notice: Subject to any disclaimer, the term of this patent is extended or adjusted under 35 U.S.C. 154(b) by 318 days.

(21) Appl. No.: 13/020,516

(22) Filed: Feb. 3, 2011

(65) Prior Publication Data

US 2011/0259162 A1    Oct. 27, 2011

(30) Foreign Application Priority Data

Apr. 21, 2010    (JP) .................................. 2010-098144

(51) Int. Cl.
*B23B 5/28* (2006.01)
(52) U.S. Cl.
CPC ....................................... *B23B 5/28* (2013.01)
USPC .......................................................... 82/104
(58) Field of Classification Search
USPC ........ 82/104, 105, 118; 33/1 Q, 523.1, 555.1, 33/632, 640, 651
IPC .................................................. B23B 5/28,5/34
See application file for complete search history.

(56) References Cited

U.S. PATENT DOCUMENTS

| | | | | |
|---|---|---|---|---|
| 3,256,754 A | * | 6/1966 | Rivierre et al. | 408/241 R |
| 4,116,094 A | * | 9/1978 | Dombrowski et al. | 82/104 |
| 5,561,242 A | * | 10/1996 | Naumann et al. | 73/65.09 |
| 5,664,469 A | * | 9/1997 | Naumann et al. | 82/1.11 |
| 5,678,963 A | * | 10/1997 | Heimann | 409/131 |
| 2008/0008549 A1 | * | 1/2008 | Schawe | 409/66 |
| 2010/0154606 A1 | * | 6/2010 | Thyni | 82/105 |

FOREIGN PATENT DOCUMENTS

| | | |
|---|---|---|
| JP | 08-267302 A | 10/1996 |
| JP | 11-277301 A | 10/1999 |
| JP | 2008-526533 A | 7/2008 |
| JP | 2009-056550 A | 3/2009 |

OTHER PUBLICATIONS

Japanese Office Action dated Feb. 27, 2012 issued in corresponding Japanese Patent Application No. 2010-098144.

* cited by examiner

*Primary Examiner* — Daniel Howell
*Assistant Examiner* — Alan Snyder
(74) *Attorney, Agent, or Firm* — Sughrue Mion, PLLC

(57) ABSTRACT

There is provided a wheel lathe in which the wheelset center of wheels and a spindle center can be aligned in a simple structure without using a centering part for synchronous lowering from above, and the horizontal distance from the wheelset center is measured at the position of a point along the circumference of the wheel and away from the topmost point of the wheel, such as of a point on an external edge, by a displacement meter having a fixed height, whereby the appropriate required lifting amount (lifter-required displacement) is automatically computed and the wheels are raised to allow the spindle to be appropriately fixed on a consistent basis, the device to be simplified and otherwise improved, and significant reductions to be attained in assembly and adjustment man-hours. The wheel lathe includes a lifter control device (4) used to control the operation of a lifter device (3) for raising the wheel (1) and provided with external-edge position meters (5) for measuring a point on the external edge of the wheel (1) and a lifter-required displacement calculator (6) for computing the lifter-required displacement (H) from the measured value and a known dimensional value.

4 Claims, 7 Drawing Sheets

From (1): $R^2 = a^2 + y^2 - 2by + b^2$

From (2): $y^2 = R^2 + 2Rc + c^2 - d^2$ $y = \sqrt{(R^2 + 2Rc + c^2 - d^2)}$

Substituting (2) into (1) gives the following expression:

$R^2 = a^2 + \{\sqrt{(R^2+2Rc+c^2-d^2)}\}^2 - 2b\sqrt{(R^2+2Rc+c^2-d^2)} + b^2$ $R^2 = a^2 + R^2 + 2Rc + c^2 - d^2 - 2b\sqrt{(R^2+2Rc+c^2-d^2)} + b^2$ $a^2 + 2Rc + c^2 - d^2 - 2b\sqrt{(R^2+2Rc+c^2-d^2)} + b^2 = 0$ $a^2 + b^2 + c^2 - d^2 + 2Rc - 2b\sqrt{(R^2+2Rc+c^2-d^2)} = 0$ $-a^2 - b^2 - c^2 + d^2 - 2Rc = -2b\sqrt{(R^2+2Rc+c^2-d^2)}$ The following is produced when both sides are squared:

$(-a^2-b^2-c^2+d^2-2Rc)^2 = 4b^2(R^2+2Rc+c^2-d^2)$

Expanding the entire expression, we obtain the following:

Right side $= 4b^2R^2 + 8b^2cR + 4b^2c^2 - 4b^2d^2$

Left side $= (-a^2-b^2-c^2+d^2-2Rc) \times (-a^2-b^2-c^2+d^2-2Rc)$ $= +a^4 + a^2b^2 + a^2c^2 - a^2d^2 + 2a^2cR$ $+ a^2b^2 + b^4 + b^2c^2 - b^2d^2 + 2b^2cR$ $+ a^2c^2 + b^2c^2 + c^4 - c^2d^2 + 2c^3R$ $- a^2d^2 - b^2d^2 - c^2d^2 + d^4 - 2Rcd^2$ $+ 2a^2cR + 2b^2cR + 2c^3R - 2cd^2R + 4R^2c^2$ $= +4c^2R^2 + 4a^2cR + 4b^2cR - 4cd^2R + 4c^3R$ $+ a^4 + b^4 + c^4 + d^4 + 2a^2b^2 + 2a^2c^2 - 2a^2d^2 + 2b^2c^2 - 2b^2d^2 - 2c^2d^2$ $= +4c^2R^2 + (4a^2c + 4b^2c - 4cd^2 + 4c^3)R$ $+ a^4 + b^4 + c^4 + d^4 + 2a^2b^2 + 2a^2c^2 - 2a^2d^2 + 2b^2c^2 - 2b^2d^2 - 2c^2d^2$ Rearranging the left side and the right side gives:

$+4c^2R^2 + (4a^2c + 4b^2c - 4cd^2 + 4c^3)R$ $+ a^4 + b^4 + c^4 + d^4 + 2a^2b^2 + 2a^2c^2 - 2a^2d^2 + 2b^2c^2 - 2b^2d^2 - 2c^2d^2$ $- 4b^2R^2 - 8b^2cR - 4b^2c^2 + 4b^2d^2 = 0$ $+ 4(c^2-b^2)R^2 + 4c(a^2+c^2-b^2-d^2)R$ $+ a^4 + b^4 + c^4 + d^4 + 2a^2b^2 + 2a^2c^2 - 2a^2d^2 - 2b^2c^2 + 2b^2d^2 - 2c^2d^2 = 0$

Assuming that $AR^2 + BR + C = 0$ gives the following result:

$A = 4(c^2 - b^2)$ $B = 4c(a^2 + c^2 - b^2 - d^2)$ $C = (a^2+b^2)^2 + (c^2+d^2)^2 + 2\{a^2(c^2-d^2) + b^2(-c^2+d^2)\}$

We substitute this into the solution formula, and obtain our result from $R = \{-B - \sqrt{(B^2 - 4 \cdot A \cdot C)}\} / 2 \cdot A$ Calculating the distance Y from the center of the support roller to the wheel center gives $Y = \sqrt{\{(R+c)^2 - d^2\}}$.

Therefore, the calculated lifter-required displacement difference H can be obtained as $H = h - Y$.

WHEEL LATHE

BACKGROUND OF THE INVENTION

1. Field of the Invention

The present invention relates to a wheel lathe for forming and cutting new wheels for railway vehicles and the like, or for grinding wheels worn down or deformed by travel; the wheel lathe having a centering device for lifting the wheels and synchronizing the wheelset center with the spindle center.

2. Description of the Related Art

To cut or grind wheels, two wheels that are moved along laid rails and provided to the right and left of a wheel axle are brought in, raised by a lifter device, fixed using a fixing device to a spindle rotatably supported on a spindle platform, and processed, for example. In these cases, however, the wheelset center of the wheels and the spindle center (processing center) are chucked in alignment with the spindle using a jaw, clamped from the left and right (using a headstock, tailstock, and the like), or are otherwise fixed to the spindle.

In the past, centering devices were used in order to raise such wheels using a lifter device and to align the wheelset center and the spindle center. These centering devices were configured so that, for example, a centering part disposed at the topmost point of the wheels is lowered in synchrony with the raising of the wheels at the same time as the wheels are raised from below, the raising of the wheels is stopped at a position in which the centering part comes into contact with the area at the topmost point of the external edge of the wheels, and fine-tuning is performed in correspondence with the size of the outside diameter dimensions of the wheels to automatically align the wheelset center and the spindle center.

Furthermore, conventional centering devices have a configuration in which a spindle is laterally installed so that the spindle center is positioned in the middle between the raising part of the lifter device and the topmost-point centering part. The lifter device is constructed of two bearing rollers, which are raising parts, and a bearing roller hoisting device for hoisting the rollers; and has a configuration in which the topmost-point centering part is lowered in synchrony with the two bearing rollers and at the same speed as the raising speed when the two bearing rollers are brought into contact with the lower part of the wheels and raised. The spindle center is constantly kept at an intermediate point between the two rollers, and stopping the raising of the wheels when the centering part is brought into contact with the raised wheels therefore allows the wheelset center and the spindle center to be approximately aligned on a consistent basis even in cases in which the correct outside diameter of the wheels is unknown.

Errors corresponding to the size of the outside diameter of the wheels arise because of the configuration in which the wheels are raised by two bearing rollers, but correcting the errors allows the wheelset center and the spindle center to be aligned automatically on a consistent basis within an acceptable margin of error.

Although such conventional centering devices can raise and center wheels with good stability by using two bearing rollers, the synchronously lowered centering part must be disposed at the topmost point of the wheels, requiring complex mechanisms and making it difficult to reduce the size and cost of the equipment.

In addition, the centering part and the lifter device must be hoisted synchronously in the manner described above, requiring complex mechanisms to be used and large amounts of time to be spent for positioning and adjusting each part, and bringing about other problems related to practical use.

PRIOR ART REFERENCES

Patent Document 1: Japanese Laid-open Patent Publication 8-267302

SUMMARY OF THE INVENTION

An object of the present invention is to provide a wheel lathe that includes a centering device having excellent utility wherein a wheelset center of wheels and a spindle center can be aligned in a simple structure without using a centering part for synchronous lowering from above, and the horizontal distance from the wheelset center is measured at the position of a point along the circumference of the wheel and away from the topmost point of the wheel, such as of a point on an external edge, by a displacement meter having a fixed height, whereby the appropriate required lifting amount (lifter-required displacement) is automatically computed and the wheels are raised over a distance equal to the lifter-required displacement to allow the height at which the wheelset center and the spindle center are automatically aligned to be reached and the wheels to be appropriately fixed to the spindle on a consistent basis. Limitations requiring that a centering mechanism be provided at the topmost point can therefore be dispensed with; the device can be simplified, made compact, reduced in cost, and otherwise improved; the lifter-required displacement can be computed by a simple measurement operation, such as measuring the position of another point along the wheel circumference and away from the topmost point, without requiring a complex positioning operation, adjustment operation, or the like; and potentially substantial reductions in assembly, adjustment man-hours, and the like can be achieved.

A summary of the present invention will now be described with reference to the attached drawings.

A first aspect of the invention relates to a wheel lathe for cutting or grinding wheels 1 by raising the wheels 1, matching a wheelset center to a spindle 2 center, and fixing the wheels; the wheel lathe comprising a lifter device 3 for raising the wheels 1 and a lifter control device 4 for operating the lifter device 3 to raise the wheels 1 over a distance equal to a lifter-required displacement H up to a height at which the wheelset center of the wheel 1 is aligned with the spindle 2 center; wherein the lifter control device 4 includes external-edge position meters 5 for measuring a point on an external edge of the wheels 1 and a lifter-required displacement calculator 6 for computing the lifter-required displacement H from the measured value of the external-edge position meter 5 and from a known dimensional value needed in order to compute the outside diameter of the wheel 1 or the height of the wheelset center of the wheel 1.

A second aspect of the invention relates to the wheel lathe according to the first aspect, wherein the external-edge position meter 5 is constructed of a measurement device for detecting the height b of a measurement position on a lateral external edge at a point away from the topmost point the wheel 1, and the horizontal distance a from the wheelset center of the wheel 1.

A third aspect of the invention relates to the wheel lathe according to the second aspect, wherein the lifter control device 4 is configured so as to measure the horizontal distance a from the wheelset center at a height b in a measurement position by detecting a point away from the topmost point of the wheel 1 along the circumference of the wheel at a predetermined height b using the external-edge position meter 5 provided so as to be able to move horizontally at the predetermined height b relative to a reference position; and to output both the height and the horizontal distance a values as the measured values, or the height b as the known dimensional value and the horizontal distance a as the measured value, to the lifter-required displacement calculator 6 to compute the lifter-required displacement H.

A fourth aspect of the invention relates to the wheel lathe according to any one of the first through third aspects, wherein the lifter device 3 is constructed of two bearing rollers 7 for bearing the wheel 1 and a bearing roller hoisting device 8 for raising the bearing rollers 7 to raise the wheels 1; is configured so as to control the bearing roller hoisting device 8 using the lifter control device 4 and to raise the wheels 1 over a distance equal to the lifter-required displacement H by raising the bearing rollers 7; and is configured so as to compute the lifter-required displacement H using the lifter-required displacement calculator 6 of the lifter control device 4.

A fifth aspect of the invention relates to the wheel lathe according to the fourth aspect, wherein the lifter-required displacement calculator 6 is configured so as to compute the lifter-required displacement H by a computational formula from a known dimensional value and a measured value, wherein the distance $2d$ between the axles of the two bearing rollers 7 of the lifter device 3, the diameter c of the rollers, the height h at the center of the spindle 2, and any one of the values including the height b of the measurement position of the external-edge position meter 5 and the horizontal distance a from the wheelset center are set as the known dimensional values; and any one or both of the height b of the measurement position and the horizontal distance a from the wheelset center are set as the measured value of the external-edge position meter 5.

The present invention is configured as aforementioned, and therefore provides a wheel lathe that includes a centering device having excellent utility wherein a wheelset center of wheels and a spindle center can be aligned in a simple structure without using a centering part for synchronous lowering from above, and the horizontal distance from the wheelset center is measured at the position of a point along the circumference of the wheel and away from the topmost point of the wheel, such as of a point on an external edge, by a displacement meter having a fixed height, whereby the appropriate required lifting amount (lifter-required displacement) is automatically computed and the wheels are raised over a distance equal to the lifter-required displacement to allow the height at which the wheelset center and the spindle center are automatically aligned to be reached and the wheels to be appropriately fixed to the spindle on a consistent basis. Limitations requiring that a centering mechanism be provided at the topmost point can therefore be dispensed with; the device can be simplified, made compact, reduced in cost, and otherwise improved; the lifter-required displacement can be computed by a simple measurement operation, such as measuring the position of another point away from the topmost point along the circumference of the wheels, without requiring a complex positioning operation, servicing operation, or the like; and potentially substantial reductions in assembly, adjustment man-hours, and the like can be achieved.

According to the second and third aspects of the invention, there is provided an innovative wheel lathe having improved utility because the measured value needed in order to compute the lifter-required displacement can be obtained with ease and the meter can be readily realized using a simple construction.

According to the fourth aspect of the invention, there is provided a highly innovative wheel lathe in which wheels can be raised with good stability on a consistent basis because the wheels are raised by two bearing rollers. Particularly according to the fifth aspect of the invention, the appropriate lifter-required displacement, including errors generated in cases in which the wheels are raised by two bearing rollers, can be calculated based, for example, on known dimensional values such as the distance between the axles of the two bearing rollers and the diameter of each of the bearing rollers, and a measured value of the position of another point (external edge of the wheels); and the appropriate lifter-required displacement can be computed on a consistent basis and the wheels raised to the appropriate height because of the configuration in which two bearing rollers are used for raising.

BRIEF DESCRIPTION OF THE DRAWINGS

FIG. 8 is an explanatory view schematically showing the computational formula used in the lifter-required displacement calculator according to the present embodiment.

DESCRIPTION OF THE PREFERRED EMBODIMENTS

Figure 1:
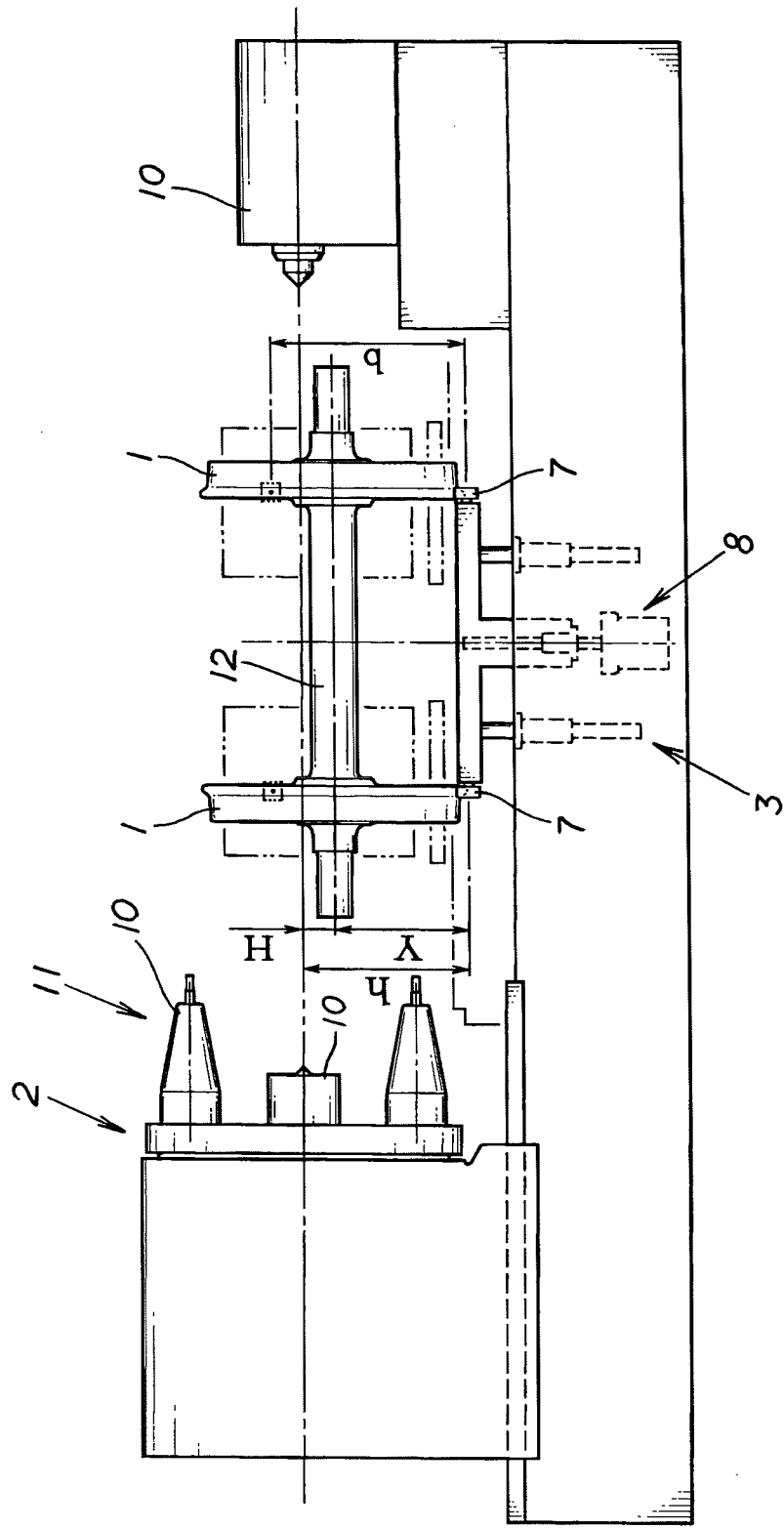
FIG. 1 is an explanatory side view of the wheels before the wheels are raised according to the present embodiment.
Figure 2:
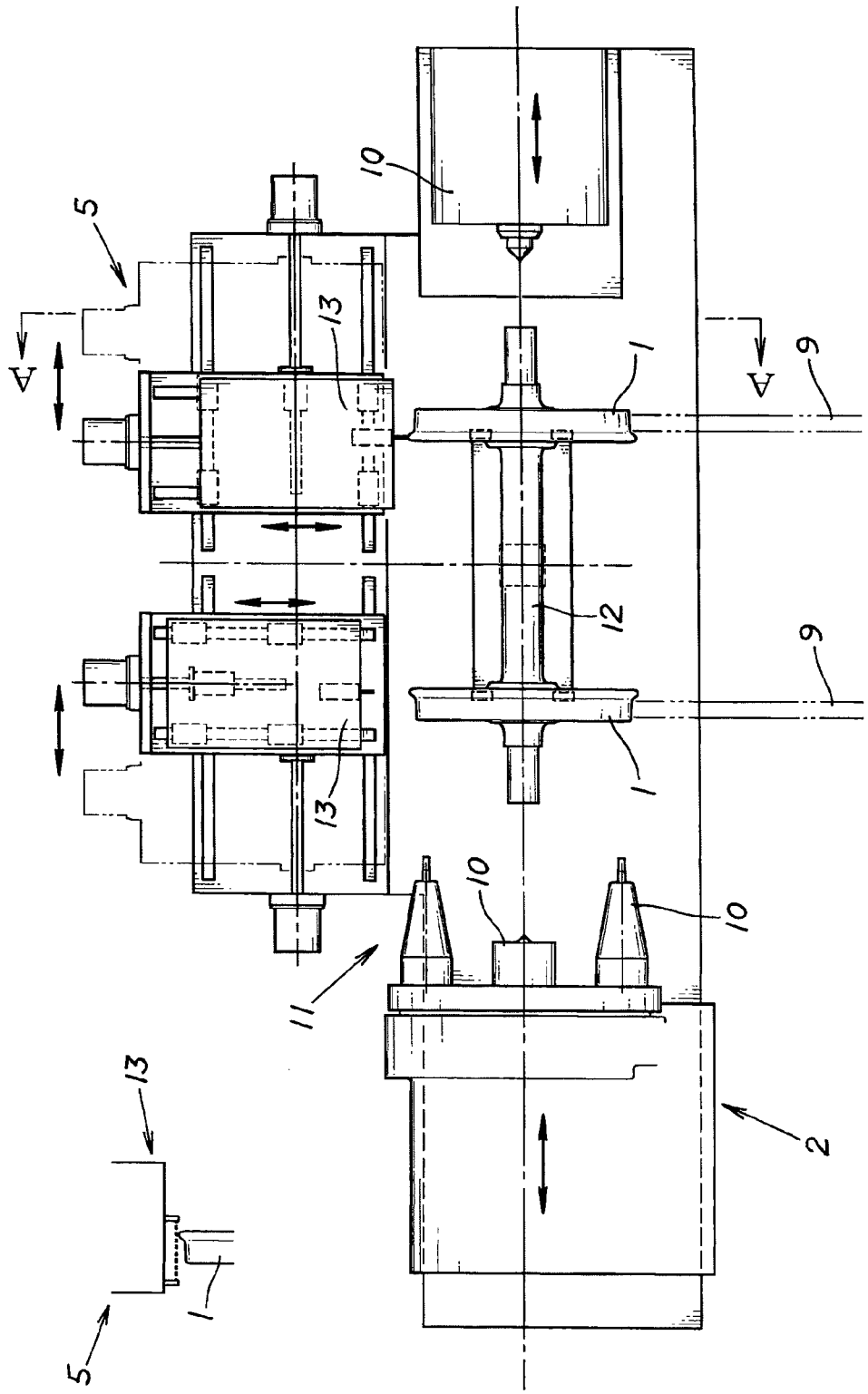
FIG. 2 is an explanatory plan view showing the manner in which the external edges of the wheels are measured before the wheels are raised according to the present embodiment.
Figure 3:
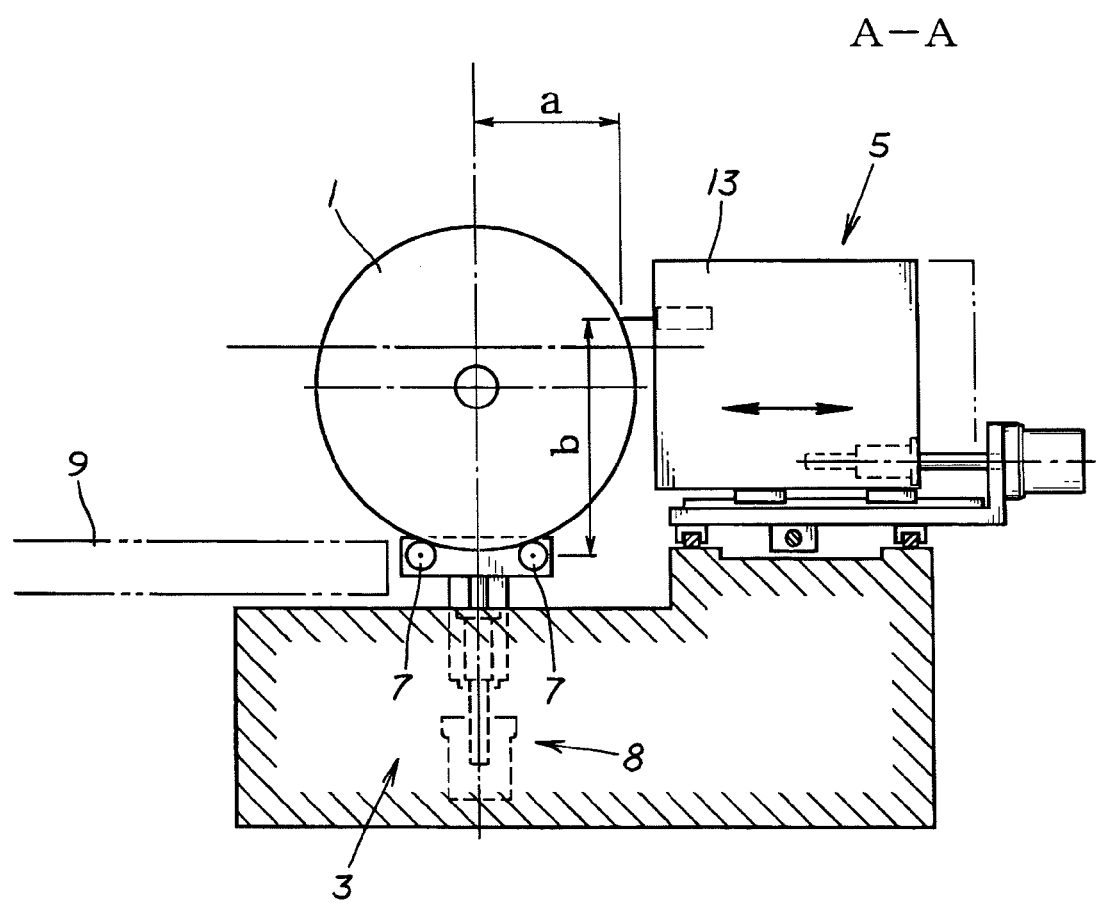
FIG. 3 is an explanatory front view (a front cross-sectional view along line A-A in FIG. 2) of the wheels before the wheels are raised and when the external edges of the wheels are measured according to the present embodiment.
Figure 4:
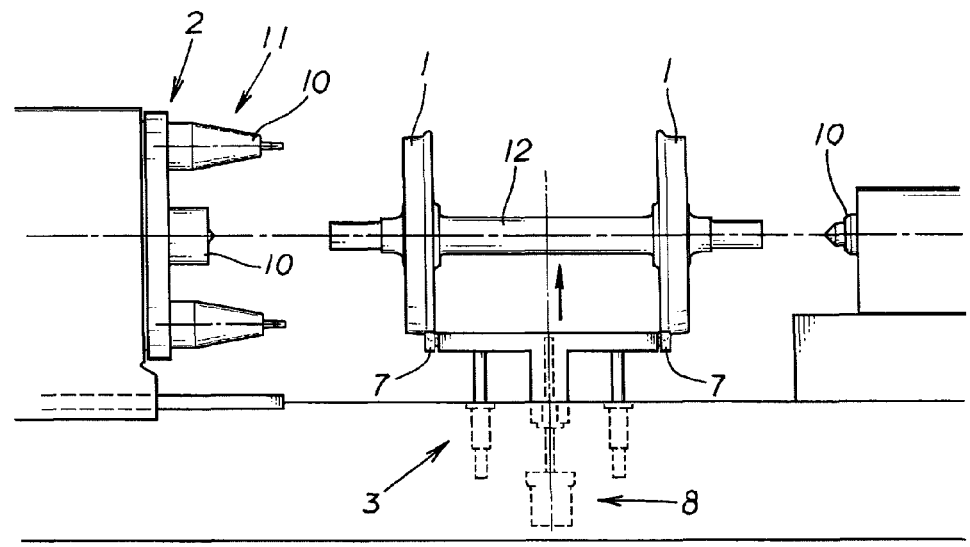
FIG. 4 is an explanatory side view of a state in which the wheels are raised to an appropriate height over a distance equal to the lifter-required displacement according to the present embodiment.
Figure 5:
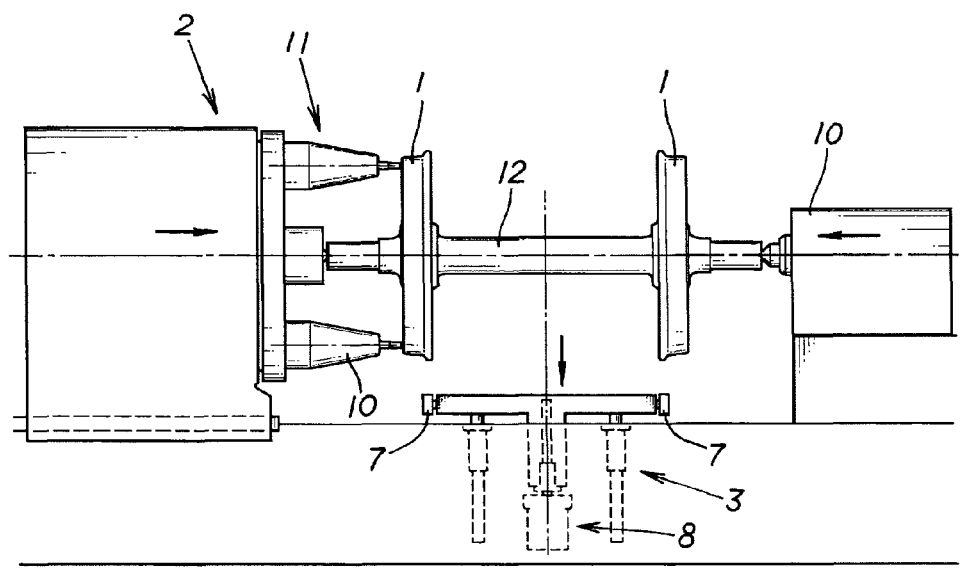
FIG. 5 is an explanatory side view of a state in which the wheels are raised to an appropriate height over a distance equal to the lifter-required displacement, and a fixing device is moved to fix the wheels to the spindle according to the present embodiment.
Figure 6:
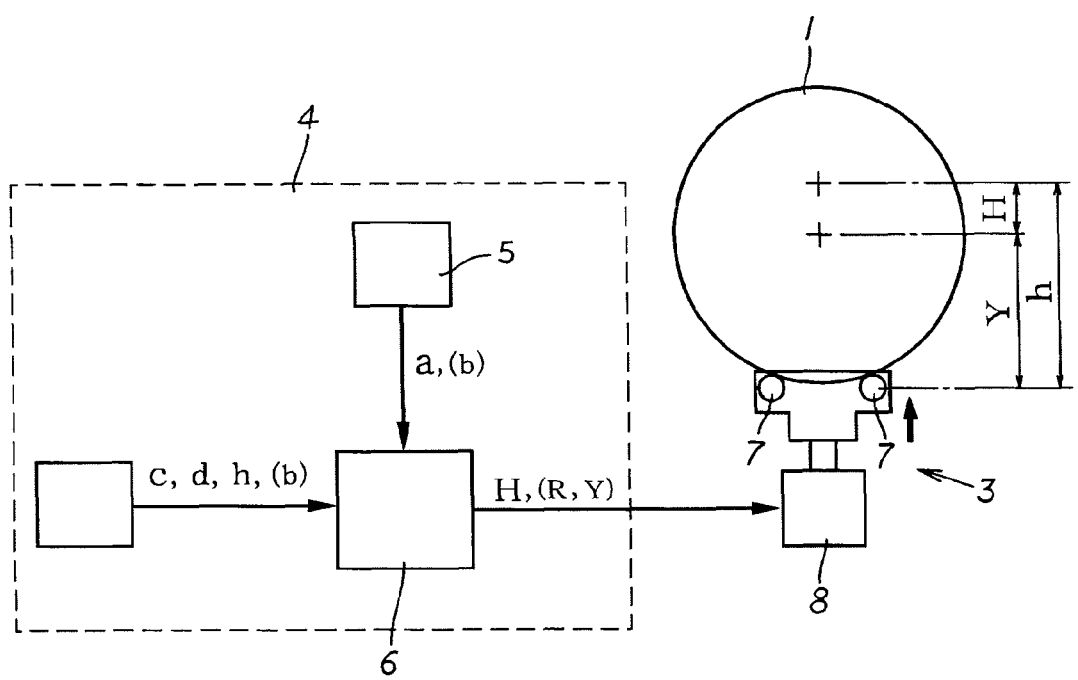
FIG. 6 is an explanatory view of a schematic configuration according to the present embodiment.

Preferred embodiments of the present invention will now be described in brief by showing the operation of the present invention with reference to the drawings.

The outside diameter (radius) of wheels 1 and the height of the wheelset center of the wheels 1 from a reference position are determined using required known dimensional values and minimum required measured values taken by external-edge position meters 5, whereby an amount H required for appropriate raising (lifter-required displacement) of the wheels 1 to a height that matches the spindle center and the wheelset center is calculated by a lifter-required displacement calculator 6 of a lifter control device 4. A lifter device 3 is operated and controlled by the lifter control device 4 to raise the wheels 1 over a distance equal to the lifter-required displacement having the calculated value computed by the lifter-required displacement calculator 6, whereby the spindle center and the wheelset center are automatically aligned on a consistent basis.

Accordingly, the wheels 1 are raised by the lifter device 3 over a distance equal to the calculated value (lifter-required displacement H) determined by the measured value of a point along the circumference of the wheels obtained using the external-edge position meters 5, and the known dimensional values of each part at the time the equipment was manufactured, whereby the wheels 1 can be automatically raised to the appropriate position and fixed to a spindle 2 on a consistent basis, and grinding and the like can performed. The use of centering parts for synchronous lowering from directly above as in the prior art is no longer necessary, restrictions imposed by the use of the topmost point are therefore removed, labor in the upper space is reduced, and a synchronous structure can be dispensed with. The device is therefore simplified, made compact, and otherwise improved, and substantial reductions are also attained in assembly and adjustment man-hours.

In cases in which, for example, the wheels are raised by two bearing rollers 7, measurements are taken to determine the height h of the spindle center from the reference position in an un-raised state, the distance 2d between the axles of the two bearing rollers 7, the radius c of the bearing rollers 7, and other point measurement values. Specifically, the diameter (outside diameter (D and radius R) of the wheels 1, the height Y from the reference position of the wheelset center, or the like can be obtained by measuring a position on the lateral external edge of the wheels 1 rather than directly above, and a difference H between the height h of the spindle center and the height Y of the wheelset center can be computed as the lifter-required displacement H by the lifter-required displacement calculator 6 of the lifter control device 4. The wheels 1 can be automatically raised to an appropriate position of alignment for both centers on a consistent basis when a bearing roller hoisting device 8 of the lifter device 3 is controlled by the lifter control device 4 to raise and drive the two bearing rollers 7 over a distance equal to the lifter-required displacement H.

In addition, in cases in which, for example, the measurement position of a point (a point on the lateral external edge) along the circumference of the wheels 1 is measured, the external-edge position meters 5 are provided so as to be able to move horizontally at a predetermined height b, and the external-edge position meters 5 are moved horizontally to detect the external edge of the height b with or without contact, whereby the height b of the measurement position and the horizontal distance a from the wheelset center are measured. In this case, a configuration may be used so that, for example, the height b is input in advance as a known dimensional value, and only the horizontal distance a is output as a measured value to the lifter-required displacement calculator 6 by the external-edge position meters 5. In this case, it is sufficient for the horizontal distance a alone to be measured merely by moving the external-edge position meters 5 horizontally from the side in such a manner as to detect the external edge. (This means that the horizontal displacement x may be measured and output to compute the horizontal distance a by the calculator 6, or that the horizontal distance a obtained based on the horizontal displacement x may be output as a measured value). It is unnecessary to provide a centering part or to perform synchronization directly above as in the past, measurements can be taken by a simple operation using a very simple configuration, and the lifter-required displacement H can be automatically computed using measured values and given dimensional values, making it possible to obtain a wheel lathe provided with a centering device, configured as a device that can be further simplified and reduced in size and cost, and designed with excellent utility such as substantial reductions in assembly and adjustment man-hours.

Embodiments specific embodiments of the present invention will now be described with reference to the drawings.

In the present embodiment, a spindle 2 is laterally installed on a spindle head in a rotatable manner; the spindle 2 is provided with a fixing device 11 having clamping parts 10 (headstocks, tailstocks, and the like) for aligning the spindle center and the wheelset center of wheels 1 to maintain centering, as well as for pressing the wheels 1 to fix the wheels 1 to the spindle 2; and a lifter device 3 is provided whereby the wheels 1 introduced beneath the area between the openable clamping parts 10 are raised to the appropriate height (the height at which the two centers are aligned) between the clamping parts 10.

The present embodiment is configured so that introduction rails 9 are laid on the floor, the wheels 1 provided to the left and right of a wheelset axle 12 are moved along the rails 9 onto the lifter device 3, both of the wheels 1 are raised by the lifter device 3 to a height at which the wheelset center is aligned with the spindle center as described previously, the clamping parts 10 of the fixing device 11 are closed to maintain centering, and both of the pressed wheels 1 are fixedly set to the spindle 2 at each wheelset axle 12.

Specifically, the present embodiment is constructed including the lifter device 3 for supporting and raising the wheels 1, and a lifter control device 4 for operating the lifter device 3 to raise the wheels 1 over a distance equal to the lifter-required displacement H up to a height at which the wheelset center of the wheels 1 is aligned with the center of the spindle 2. The lifter device 3 in the present embodiment is constructed of two bearing rollers 7 for bearing each of the wheels 1, and a bearing roller hoisting device 8 for raising the bearing rollers 7; is constructed so as to control the bearing roller hoisting device 8 using the lifter control device 4 and to raise the wheels 1 over a distance equal to the lifter-required displacement H by raising the bearing rollers 7; and is constructed so as to compute the lifter-required displacement H using a lifter-required displacement calculator 6 of the lifter control device 4.

In addition, the lifter control device 4 is constructed including external-edge position meters 5 for measuring a point on the lateral external edge along the circumference of the wheels 1, and the lifter-required displacement calculator 6 for computing the lifter-required displacement H from the measured values of the external-edge position meters 5 and the known dimensional values necessary in order to compute the outside diameter φD of the wheels 1 and the height h of the wheelset center of the wheels 1. The external-edge position meters 5, which are meters, are constructed of a measurement device for detecting the height b of a measurement position on a lateral external edge at a point away from the topmost point the wheels 1, and the horizontal distance a from the wheelset center of the wheels 1.

Specifically, in the present embodiment, the lifter control device 4 is configured so as to measure the horizontal distance a from the wheelset center at the height b in the measurement position by detecting the lateral external edge having a predetermined height b at a point away from the topmost point the wheels 1 using the external-edge position meters 5 provided so as to be able to move horizontally at the predetermined height b relative to a reference position, and to output the height b as the known dimensional value, and the horizontal distance a as the measured value, to the lifter-required displacement calculator 6.

More specifically, the lifter-required displacement calculator 6 is configured so as to compute the lifter-required displacement H by a computational formula from a known dimensional value and a measured value wherein the distance 2d (half of which is d) between the axles of the two bearing rollers 7 of the lifter device 3, the radius c of the bearing rollers 7, the height h at the center of the spindle 2, and the height b of the measurement position of the external-edge position meters 5 are set as the known dimensional values, and the horizontal distance a from the wheelset center in the measurement position is set as the measured value of the external-edge position meter 5.

In the present embodiment, the height connecting the centers of the bearing rollers 7 of the lifter device 3 is set as the reference position in the height direction, and the external-edge position meters 5 of the present embodiment are configured so that meters 13 capable of detecting the external edge at a predetermined height b from the reference position are provided so as to be able to move in a horizontal direction as previously described, and that the horizontal displacement is measured when the meters 13 are moved toward the wheels 1 from the side and the external edge is detected; and is configured so as to compute the horizontal distance a of the external edge detected from the wheelset center on the basis of the horizontal displacement x and to output the result as a measured value to the lifter-required displacement calculator 6.

In this way, the horizontal distance a may be obtained and output based on the horizontal displacement x of the meters 13, the reference position for the horizontal displacement may be set so that the horizontal distance a is measured directly, a configuration may be provided so that the horizontal displacement x and the distance from the reference position in a horizontal direction are output and the horizontal distance a is computed using the lifter-required displacement calculator 6, and the measured value may be that of the position on the external edge along the circumference of the wheels 1 necessary in order to compute the lifter-required displacement H in addition to the known dimensional values.

In addition, providing the meters 13 to the external-edge position meters 5 in a horizontally moveable manner allows a much simpler configuration to be realized than a conventional configuration provided with a centering part for synchronous lowering from directly above, and measurement also becomes very simple. In another configuration, the meters 5 can be provided so as to be upward and downwardly moveable, and the horizontal distance a can be output as a known dimensional value, and the height b based on the displacement in the upward and downward directions as a measured value. In this case, the structure is such that the external-edge position meters 5 are provided so as to be upward and downwardly moveable, dispensing with the need to use the topmost point or synchronization. The structure can be sufficiently simplified in comparison with the conventional structure, and substantial reductions can also be attained in size and cost, as well as assembly and adjustment man-hours.

In addition, the meters 13 may be contact or noncontact. A configuration may be adopted in which, for example, the space between the emitting part and the receiving part provided as noncontact meters is blocked by the external edge to allow the external edge to be detected without contact.

An example and summary of the computational formula for computing the lifter-required displacement H using the lifter-required displacement calculator 6 according to the present embodiment will now be described.

In the present embodiment, the reference position is the height connecting the centers of the bearing rollers 7, Y is the height from the reference position to the wheelset center of the wheels 1, h is the height to the spindle center, and h−Y is the computed lifter-required displacement H.

Figure 7:
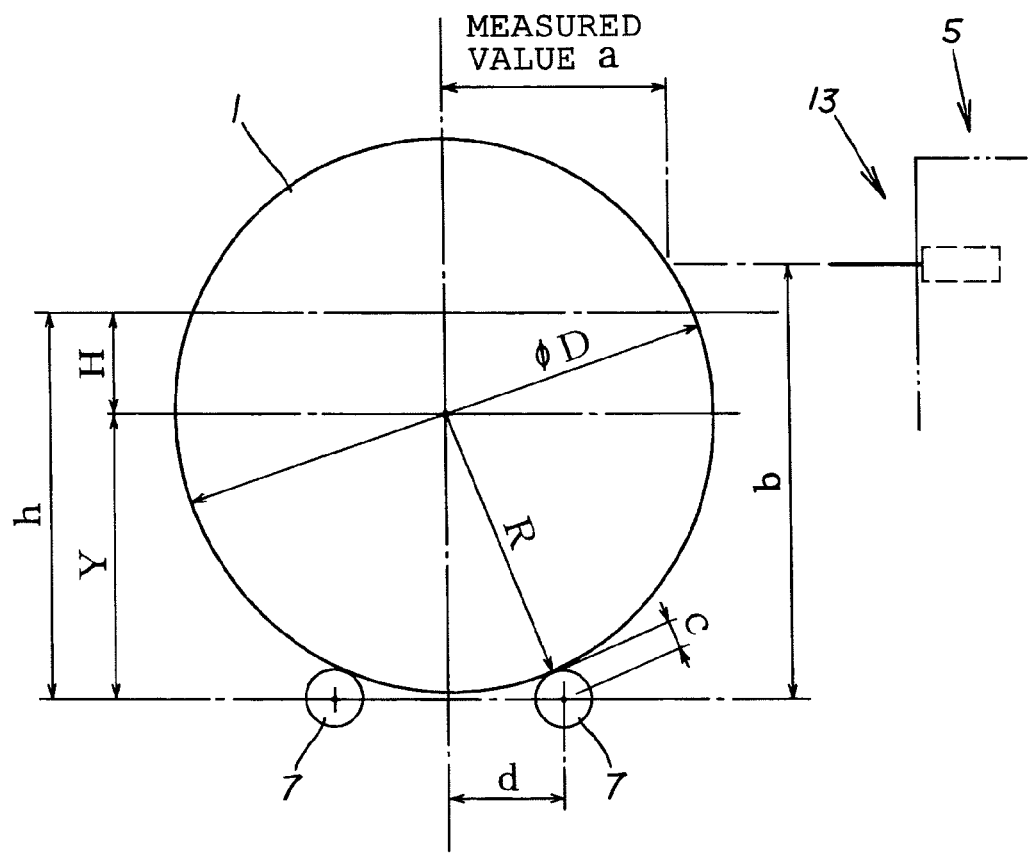
FIG. 7 is an explanatory view showing known dimensional values and measured values according to the present embodiment.

The following notation is used in the formula for computing the lifter-required displacement H, as shown in FIG. 7.

a: horizontal distance (measured value) from the wheelset center in the measurement position (height b)

b: height of the measurement position (height of the horizontal movement of the external-edge position meters 5)

c: radius of a bearing roller 7 d: half the distance between the axles (half the distance between the centers) of the bearing rollers 7

R: unknown wheel radius $\phi D$: unknown wheel diameter

A configuration is adopted in this case so that a computational program is compiled based on the computational summary shown in FIG. 8, whereby the lifter device 3 (bearing roller hoisting device 8) constructed of a servomotor is driven and controlled, as shown in FIG. 8.

The present invention is not limited to the present embodiment, and specific configurations of each structural requirement can be appropriately designed.

What is claimed is:

1. A wheel lathe for cutting or grinding wheels by raising the wheels, matching a wheelset center to a spindle center, and fixing the wheels; the wheel lathe comprising:
    a lifter device for raising the wheels; and
    a lifter control device for operating the lifter device to raise the wheels over a distance equal to a lifter-required displacement up to a height at which the wheelset center of the wheels is aligned with the spindle center;
    wherein the lifter control device includes:
    external-edge position meters for measuring a point on an external edge of the wheel; and
    a lifter-required displacement calculator for computing the lifter-required displacement from the measured value of the external-edge position meter and from a known dimensional value needed in order to compute the outside diameter of the wheel or the height of the wheelset center of the wheel,
    wherein the external-edge position meter is constructed of a measurement device for detecting both the height of a measurement position on a lateral external edge at a point away from the topmost of the wheel, and the horizontal distance from the wheelset center of the wheel, or a measurement device for detecting, while any of the height of the measurement position of the external-edge position meter and the horizontal distance from the wheelset center is set as the known dimensional value, the other of the height of the measurement position and the horizontal distance from the wheelset center.

2. The wheel lathe according to claim 1, wherein the lifter control device is configured so as to measure the horizontal distance from the wheelset center at a height in a measurement position by detecting a point along the circumference of the wheel at a predetermined height and away from the topmost point of the wheel using the external-edge position meter provided so as to be able to move horizontally at the predetermined height relative to a reference position; and to output both the height and the horizontal distance values as the measured values, or the height as the known dimensional value and the horizontal distance as the measured value, to the lifter-required displacement calculator to compute the lifter-required displacement.

3. The wheel lathe according to any one of claims 1 and 2, wherein the lifter device is constructed of two bearing rollers for bearing the wheels and a bearing roller hoisting device for raising the bearing rollers to raise the wheels; is configured so as to control the bearing roller hoisting device using the lifter control device and to raise the wheels over a distance equal to the lifter-required displacement by raising the bearing rollers;

and is configured so as to compute the lifter-required displacement using the lifter-required displacement calculator of the lifter control device.

4. The wheel lathe according to claim 3, wherein the lifter-required displacement calculator is configured so as to compute the lifter-required displacement by a computational formula from a known dimensional value and a measured value, wherein the distance between the axles of the two bearing rollers of the lifter device, the diameter of the rollers, the height at the center of the spindle, and any one of the values including the height of the measurement position of the external-edge position meter and the horizontal distance from the wheelset center are set as the known dimensional values; and any one or both of the height of the measurement position and the horizontal distance from the wheelset center are set as the measured value of the external-edge position meter.

* * * * *